Inventors
Donald M. Lawrence
Samuel K. Lehman
By David F. Doody
Attorney

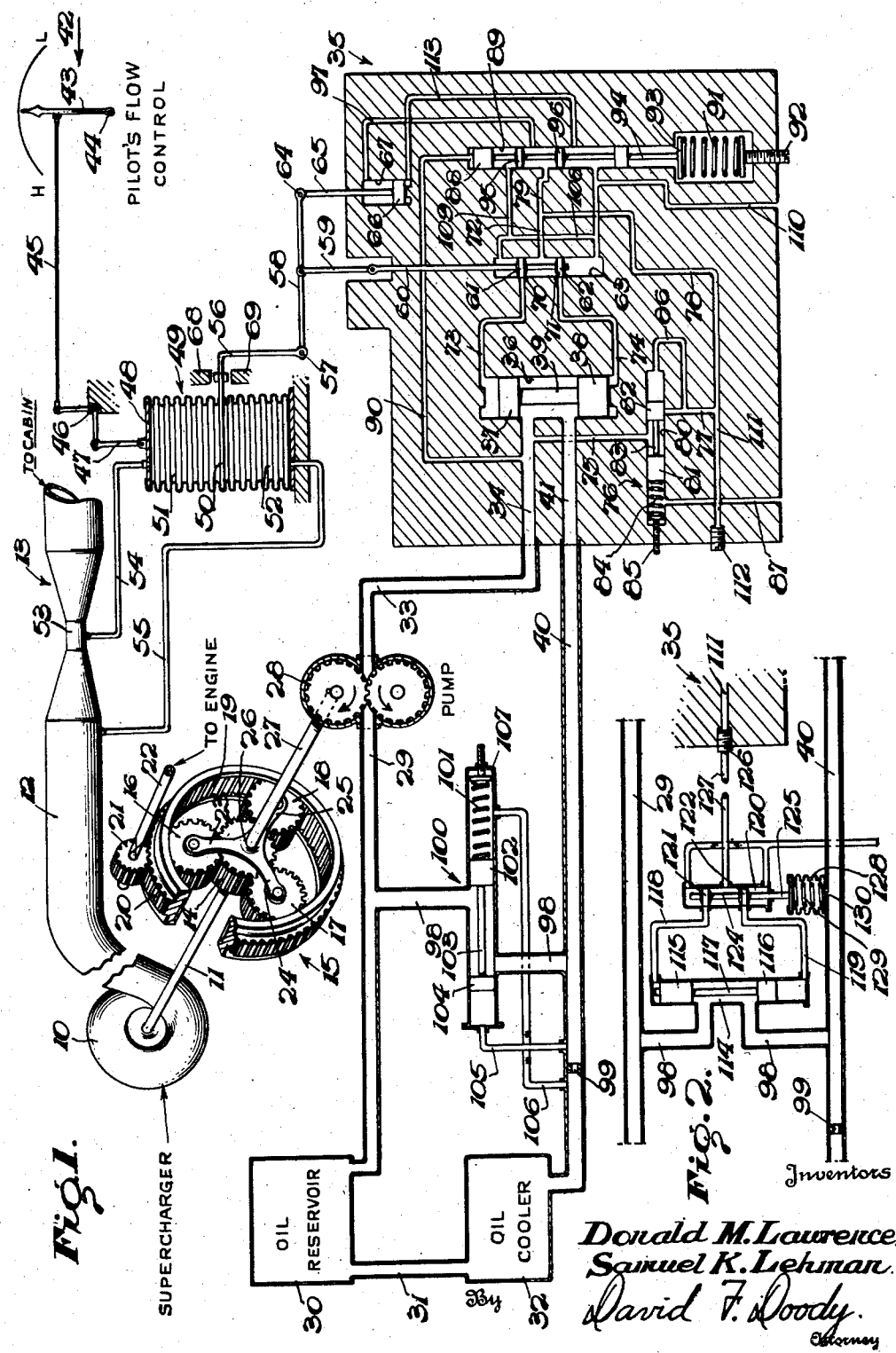

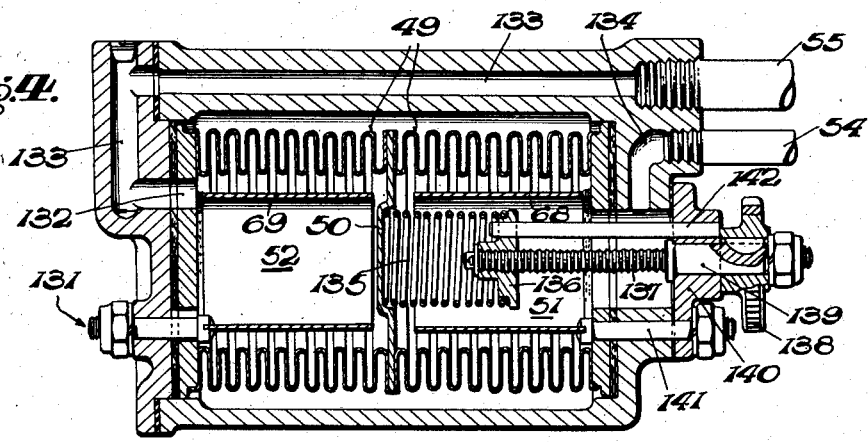

Patented Dec. 4, 1945

2,390,487

UNITED STATES PATENT OFFICE 2,390,487

FLOW REGULATING SYSTEM

Donald M. Lawrence, Caldwell, N. J., and Samuel K. Lehman, Brooklyn, N. Y., assignors to Bendix Aviation Corporation, South Bend, Ind., a corporation of Delaware Application November 29, 1941, Serial No. 421,082

7 Claims. (Cl. 230—11)

This invention relates to fluid flow systems, and more particularly to a system for controlling the rate of flow of air to a supercharged aircraft cabin.

As scheduled aircraft flight at the higher altitudes is already an accomplished fact, systems have been devised for controlling the pressure and rate of flow of air to the passengers in a sealed and supercharged cabin.

It is an object of the invention to provide a fluid flow control system wherein a desired rate of fluid flow is maintained through pressure sensitive elements operating suitable monitoring servomotors.

It is another object of the invention to provide a fluid flow control system wherein automatic means are incorporated for preventing the maintenance of excessive rates of flow.

Other objects of the invention include the provision of a pressure sensitive device for permitting the circulation of a working fluid in accordance with predetermined conditions, and the provision of a temperature responsive device for controlling the circulation of a working fluid in accordance with predetermined temperature changes.

Other objects will appear from a study of the following specification when made in conjunction with the attached drawings, throughout which like numerals designate like parts.

Fig. 1 is a showing, partly schematic and partly in perspective, of a flow control system, which is one embodiment of the present invention;

Fig. 2 is a detailed diagrammatic showing of an alternative structure which may be embodied in the system shown in Fig. 1.

Fig. 3 is an end elevation, with parts in section, of a pressure regulating bellows and linkage utilized in the system shown in Fig. 1.

Fig. 4 is a longitudinal sectional view of the bellows taken along the line 4—4 of Fig. 3.

Fig. 5 is another sectional view of the bellows taken along the line 5—5 of Fig. 3.

Figure 6:
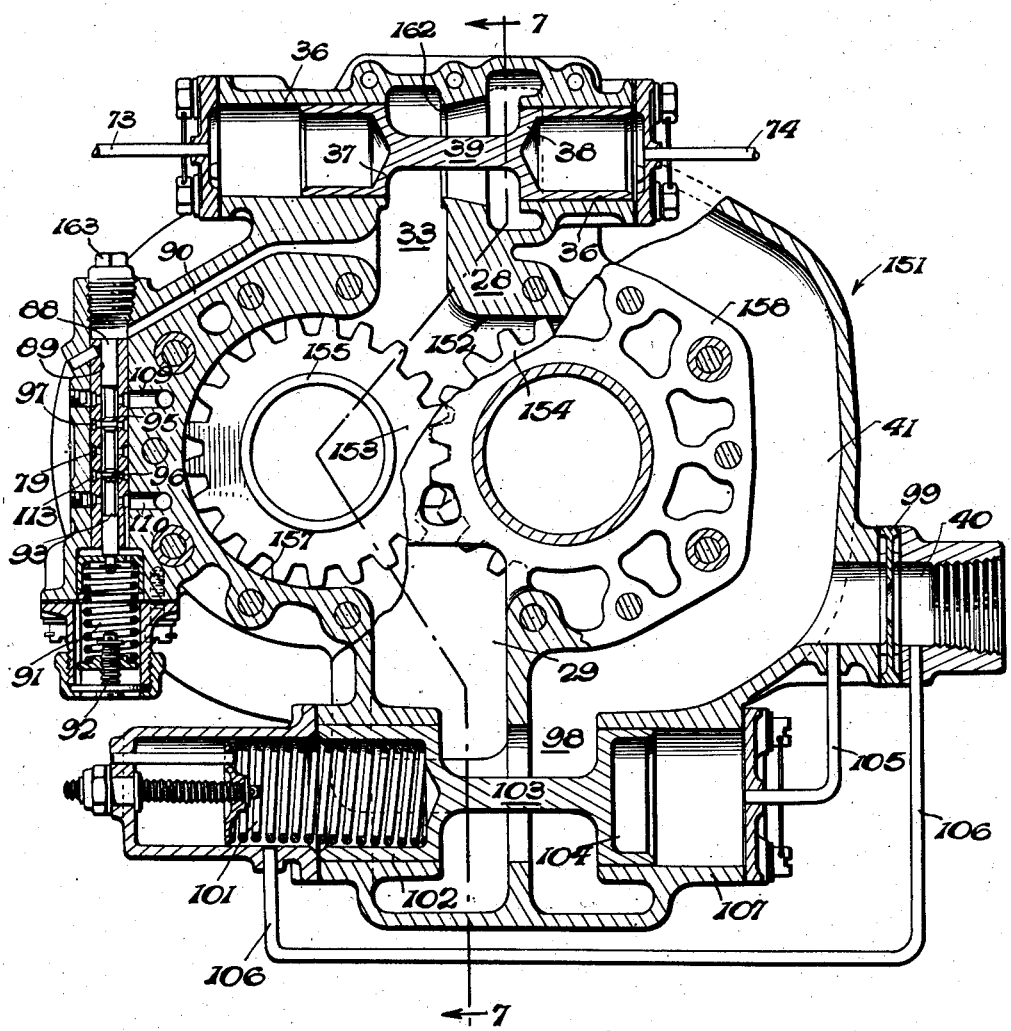
Fig. 6 is a cross-sectional view of a pump and flow regulator assembly utilized in the system of Fig. 1.

A supercharger or blower 10 having a shaft 11 is connected to an aircraft cabin (not shown) by way of a conduit 12 and a Venturi tube 13. Shaft 11 is connected to a sun gear 14 of a planetary differential gear train 15, having planet pinions 16, 17 and 18 in engagement with gear 14, and also in mesh with an internal spur gear 19, which latter gear carries an external ring gear 20 in engagement with a pinion 21, which is driven through a shaft 22 by an engine (not shown). Planet pinions 16, 17 and 18 have stub shafts carried by arms 23, 24 and 25, respectively, of a spider member 26. The spider member 26 is carried by a shaft 27 connected to one of the gears within the housing of a conventional gear pump 28. Pump 28 has an input conduit 29, which supplies oil thereto from a reservoir 30 containing oil, which is delivered thereto through conduit 31 from a conventional oil cooler 32.

Pump 28 has an output conduit 33 which is connected to a channel 34 within the housing of a pressure regulator 35. Channel 34 terminates in a cylinder 36 containing pistons 37 and 38, which are connected together by means of a piston rod 39. Piston 38 acts also as a valve to throttle the output of pump 28 in a manner to be described later. These pistons are slidable within cylinder 36 in a fluid-tight relation, and when in the position shown, fluid may flow through channel 34, cylinder 36 and be carried to return fluid conduit 40 by way of a channel 41. Return conduit 40 opens into oil cooler 32, as will be readily seen.

Supercharger 10 will deliver air to the aircraft cabin at varying rates, depending upon its speed of rotation. In order to drive the supercharger 10 at a speed suitable to maintain a selected rate of air flow, the differential gearing 15 and the pump 28 afford a means for controlling the speed of supercharger 10 to give certain air-flow rates regardless of the speed of engine 22. In the Mitchell Patent 1,028,128, there is shown a variable speed drive wherein a hydraulic pump has its output pressure varied in order that the speed of a driven shaft be regulated at a selected value. In the structure of the present invention, the output pressure of pump 28 is throttled in varying amounts under control of automatic means (to be described later) in order that the supercharger speed may be varied to deliver air in accordance with the air-flow requirements of the supercharged cabin.

At the pilot's position there is placed a rate of flow indicator 42, having a pointer 43 pivoted at point 44. A linkage, including a bar 45, a bell crank 46 and a connecting rod 47, controls the movement of end wall 48 of the flexible metallic bellows 49, which would tend to collapse in the absence of this linkage. Bellows 49 are divided by a fluid-tight partition or dividing wall 50, into compartments or chambers 51 and 52. Chamber 51 is in communication with the dynamic pressure, high velocity point of venturi 13 at the throat 53, by means of a tubular channel 54; and chamber 52 is in communication with conduit 12 or the static pressure, low velocity point of venturi 13 through tubular conduit 55.

Wall 50 carries a right-angle extension 56, which is pivoted at 57 to a movable, rigid link 58. Intermediate the ends of link 58, there is pivoted a connecting link 59, to which is connected a valve rod 60, carrying spaced valve members 61 and 62, which are movable in a valve chamber 63. The outer end of link 58 is pivoted at 64 to a piston rod 65, to which is connected a piston 66, which is slidable in cylinder 67.

Motion of partition 50 is limited by abutments 68 and 69, but sufficient clearance exists so that upon movement of partition 50 up or down, either of ports 70 or 71 may be uncovered, allowing oil under pressure to flow from channel 72 into either of the channels 73 or 74. When the system of the invention is in normal operation, the maximum pressure in output 33 may be around 1,200 pounds per square inch, and the minimum pressure may be on the order of 100 pounds per square inch. Whatever the pressure might be between these limits, the oil under pressure is bled from the pump circulating system through channel 75 into a pressure valve 76, and from there, through channels 77 and 78 to parallel channels 72 and 79. The pressure regulating valve 76 includes a valve chamber 80, in which are valve or piston members 81 and 82 connected by a rod 83. A helical spring 84 is confined within valve chamber 80 to the left of piston 81, and its resilience may be adjusted by means of screw member 85. A fluid by-pass 86 affords communication between the right end of chamber 80 and channel 77. In accordance with this arrangement, if the pressure in channel 77 falls below a predetermined minimum, for example, 100 pounds per square inch, then spring 84, which, at 100 pounds per square inch or greater is being compressed, expands and forces piston 82 to the right, thus permitting oil under pressure from channel 75 to flow into channel 77, until the pressure in channel 77 and by-pass 86 becomes sufficient to compress spring 84 and again close off channel 77, as shown in the drawings. A channel 87 is provided for permitting oil to be drawn back to a sump (not shown) or to the reservoir 30 by a suitable pump.

A servo-piston 88 is slidable in a valve chamber 89, and is open to the output pressure of pump 28 by means of the conduit 90. A helical pressure regulating spring 91, which may be adjusted by means of a screw 92, bears against a circular plate 93 attached to the end of valve rod 94. This rod carries spaced servo-valve members 95 and 96, which, in the position shown in the drawings, permit oil under pressure to flow through channel 79 and into channel 97, forcing piston 66 to be maintained in the bottom of cylinder 67. Spring 91 may have a resilience so that it will permit downward movement of piston 88 only when the pressure in the output 33 and pump 28, as reflected in channel 90, exceeds a maximum safe pressure limit for the system, as will be explained below.

In order to minimize the weight and dimensions of an oil cooler, such as 32, and an oil reservoir, such as 30, as well as the volume of oil required for the oil circulating system, a by-pass conduit 98, which contains a regulating valve 100, is provided for recirculating a majority of the oil pumped to output conduit 33 and into return conduit 40. Valve 100, when at rest, cuts off by-pass conduit 98, since spring member 101 urges piston 102 to the left of the position shown, forcing piston rod 103 and the left-hand piston 104 to be carried to the left of the position shown. The resilience of spring 101 is such that it will be compressed upon the existence in channel 105 of a predetermined pressure. An orifice plate 99 provides a restriction of flow in fluid return conduit 40, so that under certain conditions of oil flow in conduit 40, the pressure drop between channel 105 and relief channel 106, which communicates with the valve chamber 107, may be appreciable.

When the speed of rotation of pump 28 is low, the rate of flow of fluid in conduit 40 will be low, and by-pass 98 will be closed. In this condition, all oil will be returned to input 29 by way of the cooler 32 and the reservoir 30. When, however, the rate of flow of fluid in conduit 40 increases to the average for which the system is designed, orifice plate 99 causes an appreciable pressure drop between channels 105 and 106, due to the restriction it imposes upon fluid passing therethrough. When the pressure in channel 105, due to increased rate of flow in conduit 40, reaches a predetermined value, the oil will cause piston 104 to be moved from its left-hand position to the position shown in the drawings, and piston 102 then is moved to the position shown, so that direct recirculation of oil from return conduit 40 to the input conduit 29 is afforded through by-pass conduit 98. This relieves reservoir 30 and cooler 32 of the burden of supplying oil to pump 28 at high rates of flow, and permits the size of the reservoir 30 and the cooler 32 to be minimized.

A common drain of fluid in pressure regulator 35 back to a sump (not shown) or to the oil reservoir 30 is provided by means of the passageways 108, 109 and 110. A pressure conduit 111 in parallel with conduit 78 is provided with a screw closure 112. This conduit is provided for use with a by-pass regulating valve of the type shown in the Fig. 2, and it will be explained later in the specification.

The operation of the system is as follows:

When the aircraft engine drives shaft 22, ring gear 20 will be rotated. If pump 28 is running under no-load conditions with negligible frictional losses, then shaft 11 will be stationary since planet pinions 16, 17 and 18 will be rotating not only about their stub shafts, but will be carried around by virtue of their meshing with gear 19 so that rotation of shaft 27 is a maximum. When pump 28 is carrying full load, or when shaft 27 is locked, then shaft 11 will be rotated at maximum speed, since planet pinions 16, 17, 18 will be rotated about their respective stub shafts, but not about their planetary orbit, and will impart rotation to shaft 11 through their meshing with gear 14. Thus, supercharger 10 will therefore deliver air under maximum pressure through conduit 12 to the aircraft cabin. Varying loads imposed on pump 28 between minimum or zero and the maximum load may be obtained by the regulation of the output pressure in conduit 33. This pressure is regulated by throttling valve 37, under control of the servo-system governed by movement of metallic bellows 49.

When the oil circulating system is started up from rest, there will be no substantial pressure at any part of the system, and the oil in conduit 33 and channel 34 will pass freely back through return conduit 40, and into oil cooler 32. Assuming that the pilot has set pointer 43 for an increased rate of flow of a certain value through the aircraft cabin, partition 50 will be resting upon lower abutment 69, and therefore, valves 61 and 62 will be below the respective ports of the channels 73 and 74. Partition 50 will be on the lower abutment 69, since, in the beginning of operation of the system, the air-flow through venturi 13 will be exceedingly low, and the flexible bellows 49 will be collapsed. As pump 28 continues to operate, a slight pressure will be built up in channels 72 and 79. The oil flowing through channel 72 will enter channel 74, thus lifting piston 38, and cutting off channel 40 from communication with channel 34. This causes the output pressure of pump 28 to increase, and thus, additional work is absorbed by shaft 27. As additional work is absorbed, the differential gearing, as explained above, will cause an increase in the rotative speed of shaft 11, with the resultant increase in the rate of flow through venturi 13. The oil entering valve chamber 89 through channel 79 flows through channel 97 and maintains piston 66 in the position shown in the drawings.

Piston 38 will continue to interrupt flow between channels 34 and 41, and the consequent pressure increase in the output of pump 28 causes additional work to be absorbed by shaft 27, and consequently, shaft 11 continues to drive supercharger 10 at greater rotative speeds until the air-flow through venturi 13 is such that the pressure at the throat 53 drops to the point where the lowered pressure in compartment 51 balances the pressure in compartment 52, and lifts link 58 to its neutral or balanced position, as shown in the drawings. This point represents the system in operation at the rate of flow selected by the pilot by manipulation of pointer 43. It will be noted, however, that piston 38 will still maintain channel 41 blocked, and the pressure in the output of pump 28 will continue to rise. As a consequence of this rise, the rate of flow through the throat of venturi 13 increases, thus increasing the suction through conduit 54 and decreasing the internal pressure in compartment 51. This causes wall 50 to rise toward the upper abutment 68, carrying link 58 upwardly and uncovering oil under pressure in channel 72 to the upper side of piston 37 through channel 73, so that the piston valve assembly is returned to its open position, as shown. This lowers the pressure in conduit 33, and thus, reduces the rotative speed of shaft 11, and also, the flow through venturi 13, so that the pressure regulating system may become balanced at the desired rate of flow. During the operation of the system, at some predetermined rate of flow in conduit 40, the pressure in channel 105 becomes sufficient to compress spring 101 and open the by-pass 98, so that oil can be recirculated through pump 28 without passing through cooler 32.

It will be readily seen that by means of the novel system of pressure regulation described, throttling valve 38 will be operated in response to variation of airflow through venturi 13 from the desired rate of flow selected by the pilot. Further, the amount of oil circulated through the pump system is kept at a minimum by means of the by-pass 98, which permits the local recirculation of oil from pump output to pump input without the necessity of circulating oil through the cooler 32 during the greater portion of the system's operation.

In order to limit the maximum rate of air-flow, and also to limit the pressure in the output conduit 33 and channel 34 to safe values, conduit 90 is provided for communicating pump output pressures to servo-piston 88. The higher the rate of air flow required of the system by the setting of indicator 42, the greater will be the work absorbed by pump 28, and the greater will be the pressures existing in output 33, so that when pointer 43 is set by the pilot to the maximum rate of air-flow for which the system is designed, the work absorbed by pump 28 is a maximum and the pressure in conduit 33 is a maximum. Under these conditions, supercharger 10 is being driven at its maximum speed, while pump 28 is being driven at its minimum speed and under high pressure in its output. If throttling valve 38 is maintained closed, the pressure in conduit 33 and channel 34 might rise so high as to cause the destruction of the system, unless otherwise relieved. Consequently, when the maximum working pressure has been attained, servo-piston is forced downwardly against the action of spring 91 until oil under pressure flows into chamber 89, through channel 79 and into channel 113, forcing piston 66 upwardly, so that partition 50 is carried against abutment 68. As wall 50 tends to assume a position midway between abutments 68 and 69 when pressures in compartments 51 and 52 are balanced, so that upon upward movement of piston 66, wall 50 will probably bear against abutment 68 only momentarily, and even though piston 66 is in the top of cylinder 67 for an appreciable interval, wall 50 has moved extension 56 and pivot point 57 downwardly to their neutral position. In this condition, valves 61 and 62 lie above their respective ports 70 and 71, so that oil under pressure enters cylinder 36 through channel 73 and causes pistons 37 and 38 to move downwardly and establish communication between channels 34 and 41, thus relieving the pressure in the output of pump 28.

As the absorption of work by pump 28 results in a temperature rise in the oil that is being circulated, the local circulation of oil through by-pass conduit 98 may be controlled by the structure shown in Fig. 2. A valve chamber 114 is arranged intermediate the ends of by-pass conduit 98 and contains two piston valves, 115 and 116, spaced by a rod 117. This valve chamber communicates, by means of channels 118 and 119, with a servo-valve chamber 120, containing valves 121 and 122 mounted on a valve rod 124 having an extension 125. Oil under pressure is led from conduit 111 through a conventional screw coupling 126 and a conduit 127, to servo-valve chamber 120.

Extension 125 connects to the top of a flexible and sealed metallic bellows 128 containing a coiled spring 129 and being mounted upon conduit 40 by any suitable means. Bellows 128 may contain air or any other gas at any desired pressure, and the bottom thereof is separated from oil in conduit 40 by a metallic wall member 130 so that changes in the temperature of oil in conduit 40 may be transferred to the air in bellows 128.

The drawings show by-pass 98 open and servo-valves 121 and 122 covering the ports of channels 118 and 119. This is the average condition of operation, in which recirculation of oil without cooling is effected. In the presence of continued high pressure in conduit 33, the oil being returned through conduit 40 will be at a relatively high temperature, causing the air or gas in bellows 128 to be heated and expanded, thus moving valves 121 and 122 upwardly and permitting oil under pressure to flow into valve chamber 114 from conduit 127 and through channel 118. Pressure of the oil above piston valve 115 causes it to move downwardly, closing by-pass 98, so that all oil in return conduit 40 must flow through cooler 32 until the temperature of oil in conduit 40 drops to its previous, lower value, at which time the gas in bellows 128 contracts, valves 121 and 122 drop below the ports of channels 118 and 119, admitting oil under pressure through channel 119 to force piston valve upwardly to the position shown, again opening by-pass 98.

While the bellows 49 and the accompanying pressure regulating system have been shown schematically in Fig. 1, one physical embodiment thereof is shown in Figs. 3, 4 and 5, wherein a housing 131 contains bellows 49 and the servo-valve system having parts heretofore described in Fig. 1 identified by the same reference numerals. Chamber 52 has a port 132 formed in one end, which is in communication with a channel 133 formed in housing 131. This channel terminates in a screw-threaded connection with conduit 55. A similar compartment 51 is in communication with conduit 54 by means of a channel 134 formed in housing 131 and opening into compartment 51. The abutments 68 and 69 are shown as cylindrical metal sleeves welded or otherwise attached to the end faces of the end walls of compartments 51 and 52, respectively. Since for normal rates of air-flow, the pressure at throat of venturi 13 will be very much lower than the static pressure in the conduit 12, an initial pressure balance between the compartments 51 and 52 is obtained by means of the helical spring 135, which has one end abutting against the dividing wall 50, and its other end carried in a screw-face plate 136, which is carried on the extended screw-threaded member 137 which terminates in an adjusting knob 138 exteriorly of the housing 131. The shank portion 139 of screw-threaded member 137 is formed with a smooth cylindrical surface, and has a gas-tight fit with the closure member 140 that is held tightly pressed against housing 131 by means of a plurality of bolts 141. A guide bar 142 extends through closure 140 and through an aperture in the face plate 136. It will be seen without further explanation that the initial pressure balance for any particular installation may be manually set by means of the adjusting mechanism specified immediately above.

In Fig. 3, a crank arm 143 is connected to a shaft 144 which passes through an opening in housing 131, which opening is provided with a suitable sleeve bearing 145 and packing gland 146. Crank arm 143 has a transverse bore 147 in its outer end for connection to the pilot's flow-control 42 by means of any suitable link member, such as bar 45 in Fig. 1.

Shaft 144 carries at its inner end an eccentric stub shaft or pin member 148, which passes through the intermediate link member 149 (Fig. 5), which is connected at its upper end to rod 60 through a loose link 150, and at its lower end to the link 58 by means of another loose link 151.

Servo-valve members 61 and 62 are carried within valve chamber 63, having radially disposed port openings 70 and 71, respectively, connected to the pressure channels 73 and 74, respectively.

Upon displacement of the eccentric pin 148 by rotation of crank arm 142 under control of the pilot, the link 149 is translated to the left or to the right, as viewed in Fig. 5, and thus, changes the center of rotation of the linkage system controlled by wall 50 connected to servo-valves 61 and 62 through the linkage. The effect of translating the link 149, and therefore, the pivot afforded by pin 148, is the same as that obtained schematically by the vertical motion of link 47 in Fig. 1.

When the pilot adjusts the flow control, and thus translates the pivot point of link 149 to the right or to the left, as shown in Fig. 5, then dividing wall 50 will be moved toward one of the abutments 68 and 69, and valves 61 and 62 will be moved from their positions shown in Fig. 5 to permit oil under pressure from channel 72 to be directed into either of the channels 73 or 74. Assuming that oil is directed into channel 74, piston or throttle valve 38 of Fig. 1 will be moved upwardly to increase the output pressure of the pump. The speed of supercharger 10 will therefore increase until the lowered pressure in chamber 51 reaches such a value that a pressure balance is established between compartments 51 and 52 to return dividing wall 50 to the neutral position shown in Fig. 1.

Figure 7:
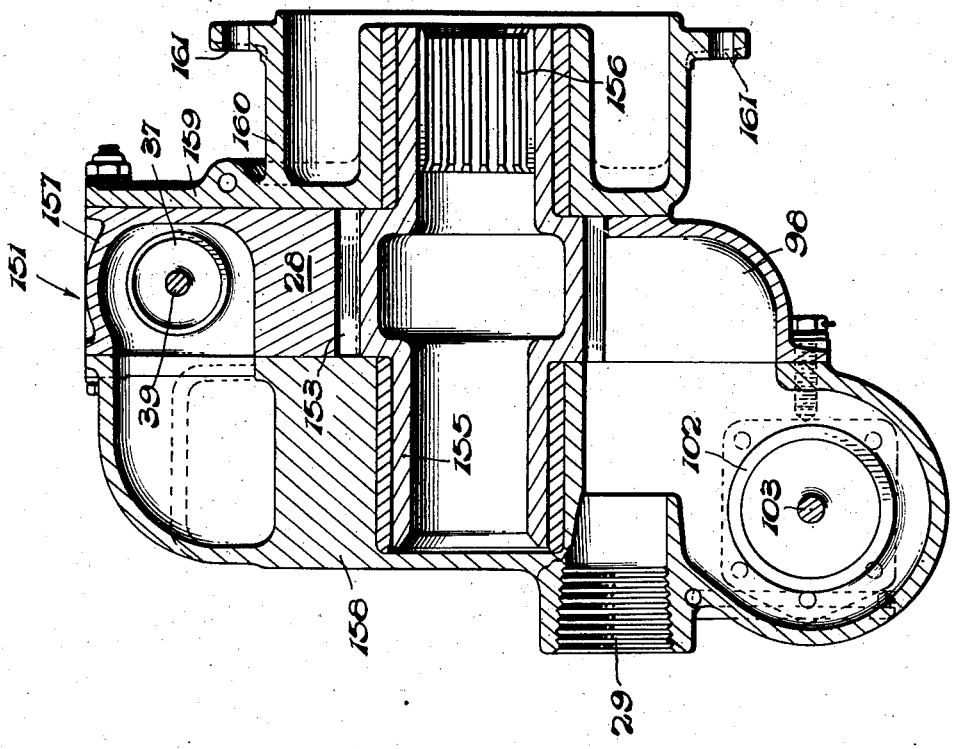
Fig. 7 is a sectional view taken along the line 7—7 of Fig. 6.

The physical embodiment of the assembly of pump 28, throttle valve 38, by-pass 98 and their associated mechanisms, is shown in Figs. 6 and 7, wherein a cast housing 151 has a pump chamber 152 containing meshing gears 153 and 154, with rotation as indicated by the curved arrow. Gear 153 is carried on a hollow drive shaft 155 that is provided at one end with internal spline members 156, by which it is connected to the shaft 27 of Fig. 1. Housing 151 comprises an intermediate portion 157, to which are fastened, by means of bolts, the housing end members 158 and 159, the latter of which carries a pedestal 160 carrying a plurality of mounting lugs 161 by which the housing 151 may be mounted directly to a suitable casing (not shown) for the differential gear train 15.

The throttling valve 38 is shown in its open position. If, however, oil under pressure flows from channel 74 of the pressure regulator, as shown in Fig. 5, into channel 74, as shown continued in Fig. 6, opening into the right end of the cylindrical valve chamber 36, then throttling valve 38 will be advanced to close the aperture 162 or to restrict the flow of oil through the aperture 162 by its movement to the right under pressure of oil in channel 74, and thus increase the output pressure of pump 28.

It will be noted that the channel 90, as described in connection with Fig. 1, is shown in Fig. 6 as opening directly into output 33 and to the head of servo-piston 88 in valve chamber 89, which chamber is shown as closed at its top by means of a screw plug 163. Should valve 38 be maintained closed until the pressure in output 33 exceeds the predetermined safe limit for the system, then servo-piston 88 will be forced downwardly and oil under pressure will flow from channel 79 through passageway 113, forcing piston 66 to the right, as shown in Fig. 5, and causing piston rod 65 to draw the rigid link 58 clockwise and rotate link 149 counterclockwise about the eccentric shaft 148, thus drawing valves 61 and 62 to the left, as shown in Fig. 5, and causing oil under pressure to flow from channel 72 into channel 73, which as shown in Fig. 6, will permit oil under pressure to enter the left-hand side of valve chamber 36 and force piston 37 to the right, returning valve 38 to its right-hand position, as shown in Fig. 6, and thus reducing the output pressure in conduit 33. The respective connections between channels 97 and 113 of Fig. 6 to the same channels designated 97 and 113 in Fig. 5, are shown schematically in Fig. 1 and have been fully described above.

It will be seen from the above explanation that the rate of air-flow through a conduit such as a conduit connecting to a supercharged aircraft cabin, is controlled primarily by controlling the speed of the supercharger or blower 10, and it is understood, of course, that the rate of air-flow varies principally with the speed of the supercharger. The pump 28 serves as an energy absorbing device, and the amount of energy absorbed under control of the pressure regulating bellows 49 and the associated servo-system, will vary by an inverse relation to the speed of the supercharger, as it is understood that the energy absorbed by the pump is dependent upon the pressure in its output. As the pump output pressure is increased, the speed of shaft 27 is decreased, indicating a greater energy absorption by the pump 28, and since the planetary gear system 15 is a differential system, when the speed of shaft 27 decreases, the speed of shaft 11 will increase. The changes in the speeds of shafts 27 and 11 will therefore always be inverse changes.

Many modifications to the system shown in Fig. 1 and to the sub-assemblies of the system as shown in Figs. 3 to 8, will occur to the skilled workman. Two embodiments of the invention are shown, and are represented in Figs. 1 and 2. It is possible that the temperature-responsive oil by-pass control set forth in Fig. 2 might be combined with the pressure-responsive by-pass of oil through by-pass conduit 98. If the control shown in Fig. 2 is utilized along with the by-pass control shown in Fig. 1, two by-pass conduits 98 can be arranged in parallel, one being responsive to pressure rise, and the other to temperature rise.

In describing the system of the present invention, only two embodiments have been discussed. It is understood, however, that the invention is not restricted to these exemplary embodiments, but is to be limited only by the scope of the appended claims.

What is claimed is:

1. A rate of flow regulator comprising a supercharger, an engine-driven differential gearing, an oil pump, a driving connection between one part of said gearing and said pump, a second driving connection between another part of said gearing and said supercharger, whereby said supercharger and said pump may be run at speed differentials, an oil reservoir connected to the input of said pump, a throttling valve assembly connected in series in the output of said pump, an oil cooler in said output, a fluid connection between said cooler and said reservoir, a fluid by-pass conduit connected between the input to said pump and the input of said oil cooler, a cabin input conduit connected to said supercharger, a Venturi tube carried thereby, a flexible bellows having a movable dividing wall forming said bellows into two compartments, said wall being at rest when a predetermined pressure relation exists between said compartments, an air connection between one of said compartments and the throat of said Venturi tube, an air connection between said cabin input conduit and the other of said compartments, means for adjusting the pressure relation between said compartments, a servo-valve assembly for operating said throttling valve to change the output pressure of said pump and thereby change the work absorbed therein in response to changes in said pressure relation, whereby the speed of said supercharger is changed to deliver air through said cabin inlet conduit at a rate sufficient to re-establish a selected pressure relation between said compartments, an orifice plate in said output conduit, a fluid channel opening from each side of said orifice plate, a pressure operated valve regulating fluid flow through said fluid by-pass and connections between said channels and said pressure operated valve for opening and closing said fluid by-pass in accordance with predetermined pressure relations across said orifice plate.

2. A rate of flow regulator comprising a supercharger, an engine-driven differential gearing, an oil pump, a driving connection between one part of said gearing and said pump, a second driving connection between another part of said gearing and said supercharger, whereby said supercharger and said pump may be run at speed differentials, an oil reservoir connected to the input of said pump, a throttling valve assembly connected in the output of said pump, an oil reservoir connected in a closed circuit between the input and output of said pump, an oil by-pass conduit connected across said input and output, a cabin input conduit connected to said supercharger, a Venturi tube carried thereby, a flexible bellows having a movable dividing wall forming said bellows into two compartments, said wall being at rest when a predetermined pressure relation exists between said compartments, an air connection between one of said compartments and the throat of said Venturi tube, an air connection between said cabin input conduit and the other of said compartments, means for adjusting the pressure relation between said compartments, a servo-valve assembly for operating said throttling valve to change the output pressure of said pump and thereby change the work absorbed therein in response to changes in said pressure relation, whereby the speed of said supercharger is changed to deliver air through said cabin inlet conduit at a rate sufficient to re-establish a selected pressure relation between said compartments, a by-pass valve for regulating oil flow through said by-pass conduit, a servo-valve for operating said by-pass valve, and means associated with said output and responsive to oil temperature rises therein above a determined value, for operating said servo-valve to close said by-pass valve.

3. A pump and flow regulator assembly comprising a housing having a gear pump therein, a pump input channel and a pump output channel, a communicating passageway between said output and said input channels, an orifice plate in said output channel, a valve member having a spring for urging said valve member into position closing said communicating passageway, means responsive to a determined pressure drop across said orifice plate to open said valve member to re-establish communication between said input and output channels, a throttling valve in said output channel, and servo-operated pressure responsive means to open said throttling valve to relieve output pressure above a selected pressure value.

4. A pump and flow regulator assembly comprising a housing, a pump therein, a pump input channel and a pump output channel, a fluid passageway between said input and output channels, a flow restricting member in said output channel, a valve member in said fluid passageway having resilient means for urging it into closed position, hydraulic motor means connected to said valve, and fluid conduits open to said motor means and to said output channel for opening said valve member upon an increase in fluid pressure in one of said conduits above a determined value.

5. In combination, driving means having a variable operating speed range, supercharger means having a definite predetermined operating value and an output zone through which fluid flow from said supercharger means is to be regulated, connecting means effective for establishing a positive driving relationship between said driving means and said supercharger means to coordinate said value and range, hydraulic means for rendering said connecting means effective, regulator means for controlling said hydraulic means, fluid flow responsive means connected to said supercharger means and including a bellows operable in response to predetermined static and dynamic pressure relationships established in said zone, and means connecting said bellows to said regulator means for operating the latter to render said hydraulic means effective for modifying said driving relationship to insure retention of said value within said range.

6. The structure of claim 5 as set forth and defined therein including, manually operable means connected to said bellows for adjusting the latter to establish said value.

7. The structure of claim 5 as set forth and defined therein including manually operable means connected to said fluid flow responsive means for rendering said bellows responsive to modified pressure relationships.

DONALD M. LAWRENCE.
SAMUEL K. LEHMAN.